United States Patent
Khafagy et al.

(12) 
(10) Patent No.: US 9,816,474 B2
(45) Date of Patent: Nov. 14, 2017

(54) STATE OF CHARGE BASED ENGINE START-STOP CONTROL

(71) Applicant: Ford Global Technologies, LLC, Dearborn, MI (US)

(72) Inventors: Hafiz Shafeek Khafagy, Dearborn, MI (US); Hanyang Chen, Canton, MI (US); Gjergji Shaska, Novi, MI (US); Ahmed Awadi, Farmington Hills, MI (US); John T. Bremmer, Sr., Ypsilanti, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 87 days.

(21) Appl. No.: 14/918,002

(22) Filed: Oct. 20, 2015

(65) Prior Publication Data

US 2017/0107963 A1    Apr. 20, 2017

(51) Int. Cl.
*F02D 41/06* (2006.01)
*F02N 11/08* (2006.01)
*F02N 11/04* (2006.01)

(52) U.S. Cl.
CPC .......... *F02N 11/0833* (2013.01); *F02N 11/04* (2013.01); *F02N 11/084* (2013.01); *F02N 11/0825* (2013.01); *F02N 2200/061* (2013.01)

(58) Field of Classification Search
CPC .. F02N 11/0833; F02N 11/04; F02N 11/0825; F02N 11/0862; F02N 2200/046; F02N 2200/061

USPC .................... 123/179.3, 179.4; 701/112, 113
See application file for complete search history.

(56) References Cited

U.S. PATENT DOCUMENTS

| | | | |
|---|---|---|---|
| 5,550,445 A | 8/1996 | Nii | |
| 6,532,926 B1 | 3/2003 | Kuroda et al. | |
| 7,216,729 B2 | 5/2007 | Syed et al. | |
| 7,237,521 B2* | 7/2007 | Yuya | F02N 11/08 123/179.1 |
| 7,689,331 B2 | 3/2010 | Moran | |
| 8,479,849 B2 | 7/2013 | Leone | |
| 9,533,675 B2* | 1/2017 | Jang | B60W 20/13 |
| 2006/0116797 A1 | 6/2006 | Moran | |
| 2010/0300781 A1 | 12/2010 | Leone | |
| 2015/0210265 A1 | 7/2015 | Rademacher et al. | |
| 2016/0229411 A1* | 8/2016 | Murata | B60L 11/123 |
| 2016/0312754 A1* | 10/2016 | Wang | F02D 29/02 |
| 2017/0028981 A1* | 2/2017 | Ogawa | B60K 6/445 |

* cited by examiner

*Primary Examiner* — Hai Huynh
(74) *Attorney, Agent, or Firm* — David B. Kelley; Brooks Kushman P.C.

(57) ABSTRACT

A controller may be configured to respond to an engine start condition that occurs while an SOC of the battery is within a first predetermined range by running an engine until first occurrence of the start condition ceasing or the SOC achieving a target. The controller may further be configured to respond to an engine start condition that occurs while the SOC is within a second predetermined range less than the first by running the engine until the SOC achieves the target.

14 Claims, 5 Drawing Sheets

STATE OF CHARGE BASED ENGINE START-STOP CONTROL

TECHNICAL FIELD

The present disclosure relates to methods and systems for controlling engine starting and stopping.

BACKGROUND

An engine of a vehicle may be automatically started or stopped to address ongoing energy needs of the vehicle. Control schemes have been used to start and stop the engine to meet such needs. One energy need provided by the engine in hybrid electric vehicles is maintenance of a battery's state of charge. Certain control schemes request the engine to auto-start below a threshold and auto-stop above a threshold. Constant cycling of the engine to meet the battery's state of charge demands may cause unnecessary wear on the engine and starter or reduce fuel economy.

SUMMARY

A method for operating a vehicle engine includes, by a processor, in response to an engine start condition occurring while an SOC is within a first predetermined range, running the engine until first occurrence of the start condition ceasing or the SOC achieving a target, and in response to an engine start condition occurring while the SOC is within a second predetermined range less than the first, running the engine until the SOC achieves the target.

A vehicle includes an engine, a battery, and a controller. The controller, in response to an engine start condition occurring while an SOC of the battery falls within a first predetermined range, runs the engine until first occurrence of the start condition ceasing or the SOC achieving a target, and in response to an engine start condition occurring while the SOC falls within a second predetermined range less than the first, runs the engine until the SOC achieves the target.

In one embodiment, the present disclosure includes running the engine until the SOC achieves the target in response to the SOC falling below the second predetermined range. The engine start condition may include an activation of an electrical load. In one preferred embodiment, the first predetermined range and the second predetermined range are numerically adjacent to each other. The controller may be configured to prohibit an engine start when the SOC falls below a minimum threshold. The target may have a value greater than values within the first and second predetermined ranges.

DETAILED DESCRIPTION

Figure 1:
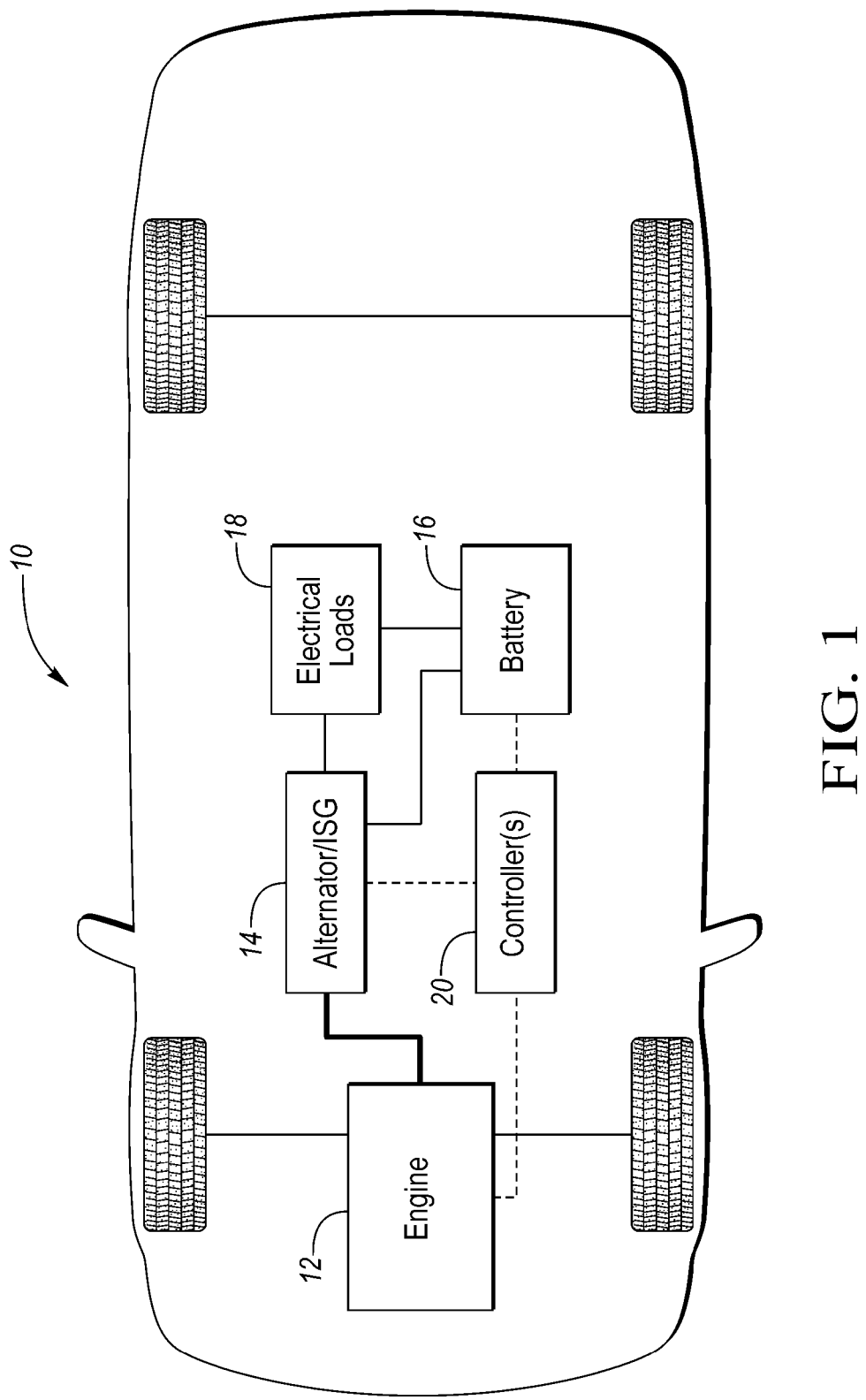
FIG. 1 is a block diagram of a hybrid vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicles can be powered by battery electricity (BEVs) for propulsion and other electrical loads such as heating and cooling. The battery may be recharged by a secondary power source (e.g. charging station, internal combustion engine, or solar panel). The battery may be arranged in an array with other batteries to provide additional voltage or longevity, and any type of battery may be used. Any type of battery including different combinations of electrolyte, anode material, cathode material, or combination thereof may power BEVs. In addition, capacitors may also be used to substitute or supplement battery arrays. Some common batteries in BEVs may include nickel metal hydride, lead-acid, and lithium-ion.

Vehicles may also be powered via a combination of battery electricity and internal combustion engine. Referred to as hybrid electric vehicles, these vehicles typically employ a combination of battery and engine propulsion and rely on these sources to power auxiliary electrical loads. Electrical loads may be heated windshields, cabin heaters, cabin coolers, auxiliary fans, sound systems, powered window actuation, wireless communications, indicators, or other electrical draws necessary for vehicle use and habitability. To replace removed electrical energy, the engine may be used to recharge the battery through a mechanically coupled electric generator. There are many known configurations used in hybrid vehicles to mechanically couple the engine to a generator (e.g. a power-split configuration using a planetary gear set). All of these configurations and future configurations are contemplated in this disclosure. The vehicle may also employ multiple engines or electric generators. Any combination or types of engines, electric generators, and alternators are also contemplated in this disclosure. One example includes a gasoline internal combustion engine and an integrated starter generator (ISG). An integrated starter generator can provide engine starting cranks while generating electricity after the engine has started.

A hybrid vehicle controller can include multiple controllers that are used to control multiple vehicle systems (referred to herein as controller). For example, a controller can be a vehicle system controller/powertrain control module (VSC/PCM). In this regard, the vehicle engine stop/start control portion of the VSC/PCM can be software embedded within the VSC/PCM, or it can be a separate hardware device. A controller would generally include any number of processors, ASICs, ICs, Memory (e.g., Flash, ROM, RAM, EPROM, and/or EEPROM) and software code to co-act with one another to perform a series of operations. A microprocessor within a controller may further include a clock to provide timing and synchronization. A controller may communicate over a CAN bus or controller area network to other components or using other communications protocols.

A controller may be configured with a battery's optimal state of charge (SOC), which is generally below the maximum battery charge. Batteries within an array may have varying maximum charge levels. The battery's (array) target may be set to 70% of a hypothetical maximum charge because the maximum charge of each individual battery may be uncertain. This 70% target may be set higher or lower depending on manufacturer specifications or requirements. It is contemplated in this disclosure that the target may be set at the actual maximum charge of the battery or could be set at a lower value. The controller may allow an auto-stop or perform an auto-stop when the battery's SOC meets or exceeds the target. An auto-stop of the engine would then stop the generation of electricity, which may prevent the battery from overcharging.

The controller may be configured with a first predetermined range numerically adjacent to or less than the target. For example, the target may be an SOC of 70% and the first predetermined range would be an SOC between 70% and 68%. The 68% SOC value may vary based on calibration of the battery prior to leaving the factory, or the 68% SOC value may be calibrated based on environmental conditions experienced during use. This configuration data may be set by a user or communications with the factory. Exact threshold values are not particular to this disclosure. The controller may be configured so that when the SOC is within the first predetermined range, the engine can auto-stop or auto-start when an engine stop/start condition is present.

The controller may be configured with a second predetermined range numerically adjacent to or less than the first predetermined range. For instance, the first predetermined range may be set for SOCs between 70%-68% and the second predetermined range may be set for SOCs between 68%-67% (that is, the first and second predetermined ranges are numerically adjacent to each other). Either range may include the threshold number. The controller may be configured so that when the SOC is within the second predetermined range, the engine can auto-start when an engine start condition is present. The controller may be further configured so that when an auto-start occurs within the second predetermined range, the controller will prevent an auto-stop from occurring until the target has been reached.

The controller may start the engine when an engine start condition occurs while the SOC is within a first predetermined range. The controller may run the engine until the condition is no longer present or the SOC achieves a target SOC, whichever occurs first.

The controller may start the engine when an engine start condition occurs while the SOC is within a second predetermined range. The second predetermined range may be less than the first. The controller may run the engine until the SOC achieves a target SOC.

The controller may be configured to auto-start the engine when the SOC falls below the second predetermined range, even if a condition is not present. A dead-band may be present between the lower threshold of the second predetermined range and the condition-less engine auto-start despite the presence of an engine auto-start condition. This means that the controller may be configured such that the lower threshold of the predetermined range is set at 67% and the engine auto-start without a condition will occur when the SOC falls below 65%.

The controller may also be configured to inhibit an auto-start when the SOC falls below a minimum threshold. An engine start requires a large cranking current, which causes a substantial load on the battery. A controller may prevent an engine from auto starting below this threshold and require a cold, user-initiated start to be performed. This prevents additional drain on the battery caused by attempts to recrank the engine when an engine start malfunction is present. An example setting of this minimum threshold is 60% SOC.

Referring to FIG. 1, a hybrid vehicle 10 may include an engine 12, ISG 14, battery 16, electrical loads 18, and controller 20. The engine may have a direct mechanical linkage to the ISG 14. The ISG may be electrically connected to the battery 16 and electrical loads 18. The battery 16 may be connected to the electrical loads 18. The controller 20 may be in communication with the engine 12, ISG 14, and battery 16.

Figure 2:
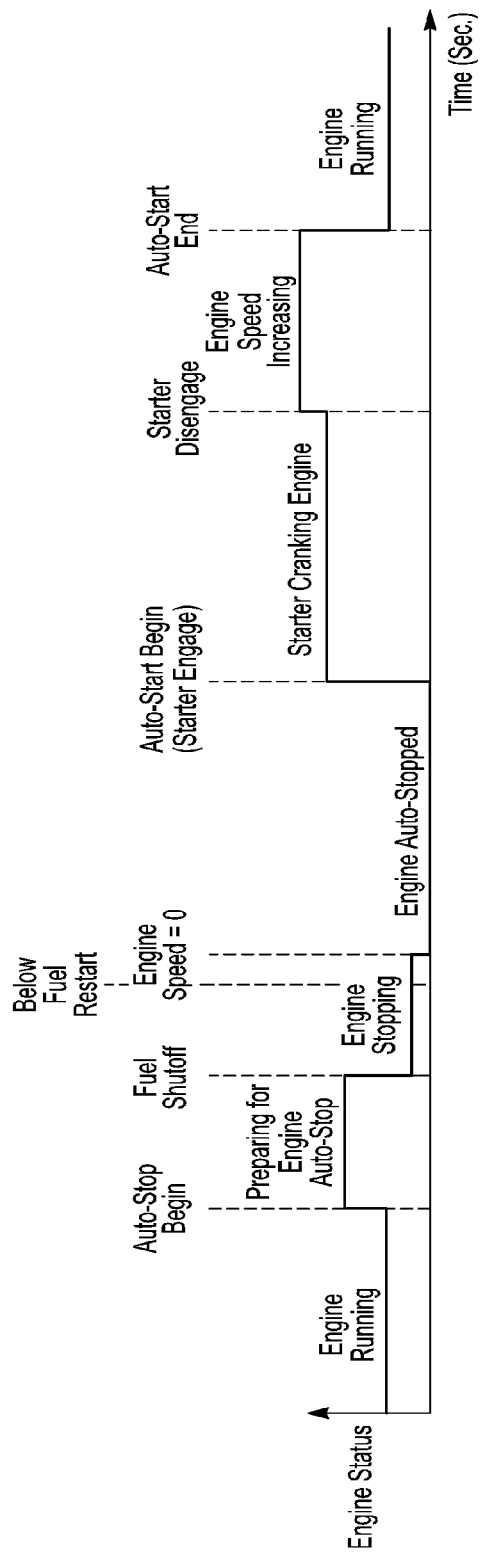
FIG. 2 is a plot of engine status versus time before, during, and after an engine start/stop event.

Referring to FIG. 2, an engine auto-stop event may include several stages. "Auto-stop begin" marks the beginning of the engine auto-stop event. "Preparing for engine auto-stop" is the time period during which vehicle systems as well as the engine are prepared for the impending engine stop. "Fuel shutoff" marks the point at which fuel flow to the engine is stopped. "Engine stopping" is the time period during which the engine speed reduces to 0. "Below fuel restart" marks the point where if a restart is requested during the "engine stopping" stage, the starter may need to be engaged to crank the engine (if a restart is requested before "below fuel restart" and during the "engine stopping" stage, the engine may be restarted by turning the flow of fuel back on). "Engine speed=0" marks the point at which the engine speed is near or equal to 0. "Engine auto-stopped" is the time period during which the engine is off. "Starter engage" marks the point at which the starter starts to crank the engine in an effort to start the engine (in response to detecting an engine auto-start condition). "Starter cranking engine" is the time period during which the engine is unable to crank under its own power. "Starter disengage" marks the point at which the engine is able to crank under its own power. "Engine speed increasing" is the time period during which the speed of the engine increases to its running speed (a speed at or above target idle speed). Finally, "auto-start end" marks the point at which the speed of the engine achieves its running speed.

In at least one instance, the controller may allow an auto-start when the SOC falls below a minimum threshold if the engine has not reached a "below fuel restart." This may be because unless the engine falls "below fuel restart" additional cranks from the starter are not required and the engine can simply restart with reinjection of fuel.

Figure 3:
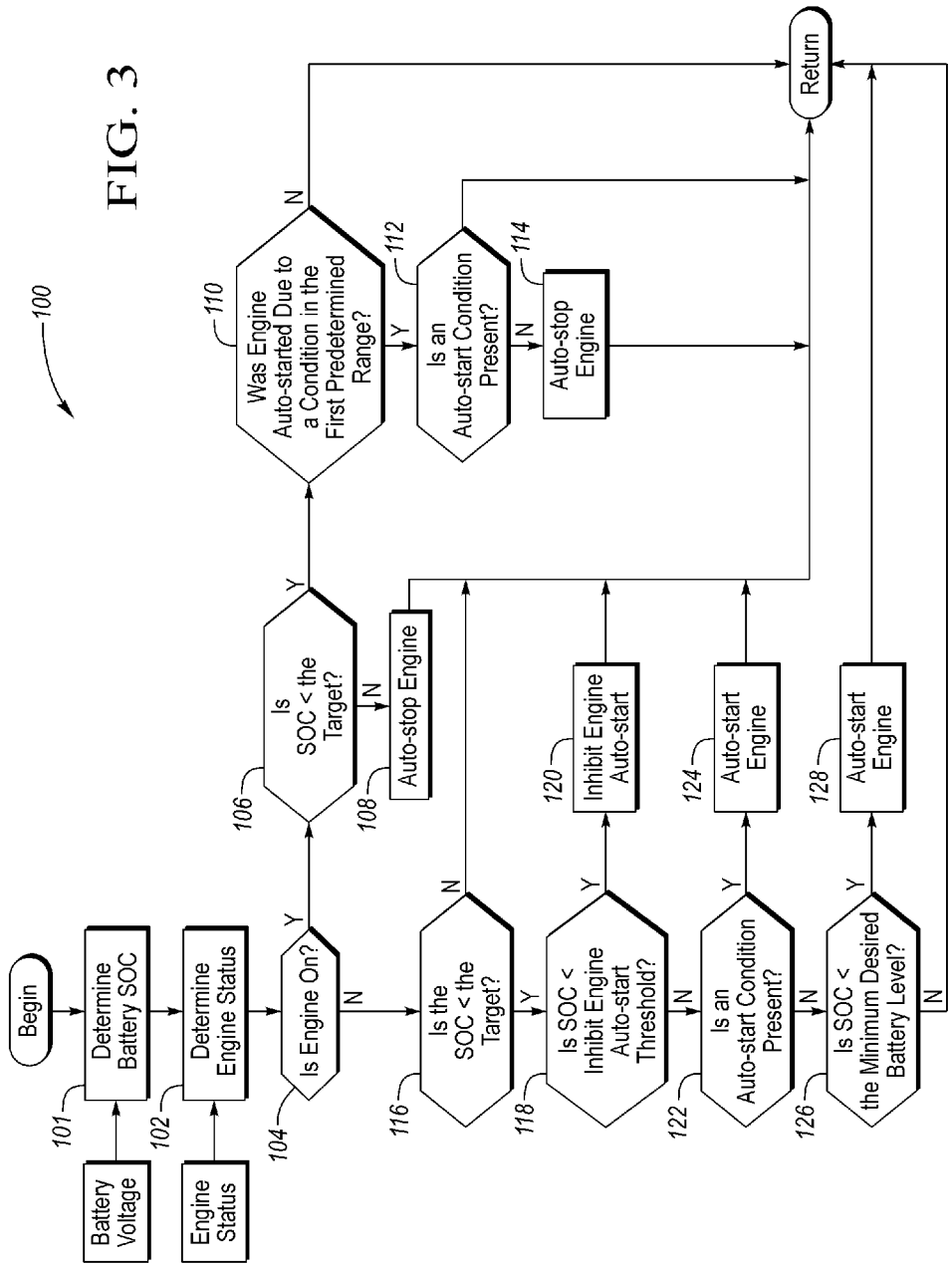
FIG. 3 is a flow chart of a control algorithm for determining whether to auto-start or auto-stop an engine.

Referring now to FIG. 3, a method 100 is depicted whereby a vehicle controller performs an embodiment of this disclosure. The method 100 is intended to continuously run. The controller receives a battery voltage and determines the battery SOC in step 101. The controller receives an engine status and determines the engine status in step 102. In step 104, the controller considers whether an engine is on. If the engine is on, the controller determines whether the SOC is less than a target in step 106.

In step 108, if the SOC is not less than the target, and the engine is on, the controller may auto-stop the engine.

In step 110, if the SOC is less than the target, the controller may determine whether the engine was auto-started due to a condition in the first predetermined range. If step 110 is false, the controller may return and restart the process.

If step 110 is true, the controller may determine whether an auto-start condition is present in step 112. If an auto-start condition is present as determined in step 112, the controller may return and restart the process.

In step 114, if an auto-start condition is not present as determined in step 112, the controller may auto-stop the engine and restart the process.

Continuing to refer to FIG. 3, if the controller determined that the engine was off in step 104, the controller may determine whether the SOC is less than the target in step 116. If the SOC is not less than the target, the controller may return and restart the process.

If the controller determined that the SOC is less than the target in step 116, the controller determines whether the SOC is less than the inhibit engine auto-start minimum threshold in step 118. After determining that the SOC is less than the inhibit engine auto-start minimum threshold, the controller may inhibit an engine auto-start and require an engine cold start in step 120.

If the result of step 118 is false, the controller may determine whether an auto-start condition is present in step 122. If an auto-start condition is present in step 122, the engine will auto-start in step 124, and the controller may return and restart the process.

If the result of step 122 is false, the controller may determine whether the SOC is less than the minimum desired battery level in step 126. If the SOC is less than the minimum desired battery level in step 126, the controller may auto-start the engine in step 128. Otherwise, the controller may return and restart the process.

Figure 4:
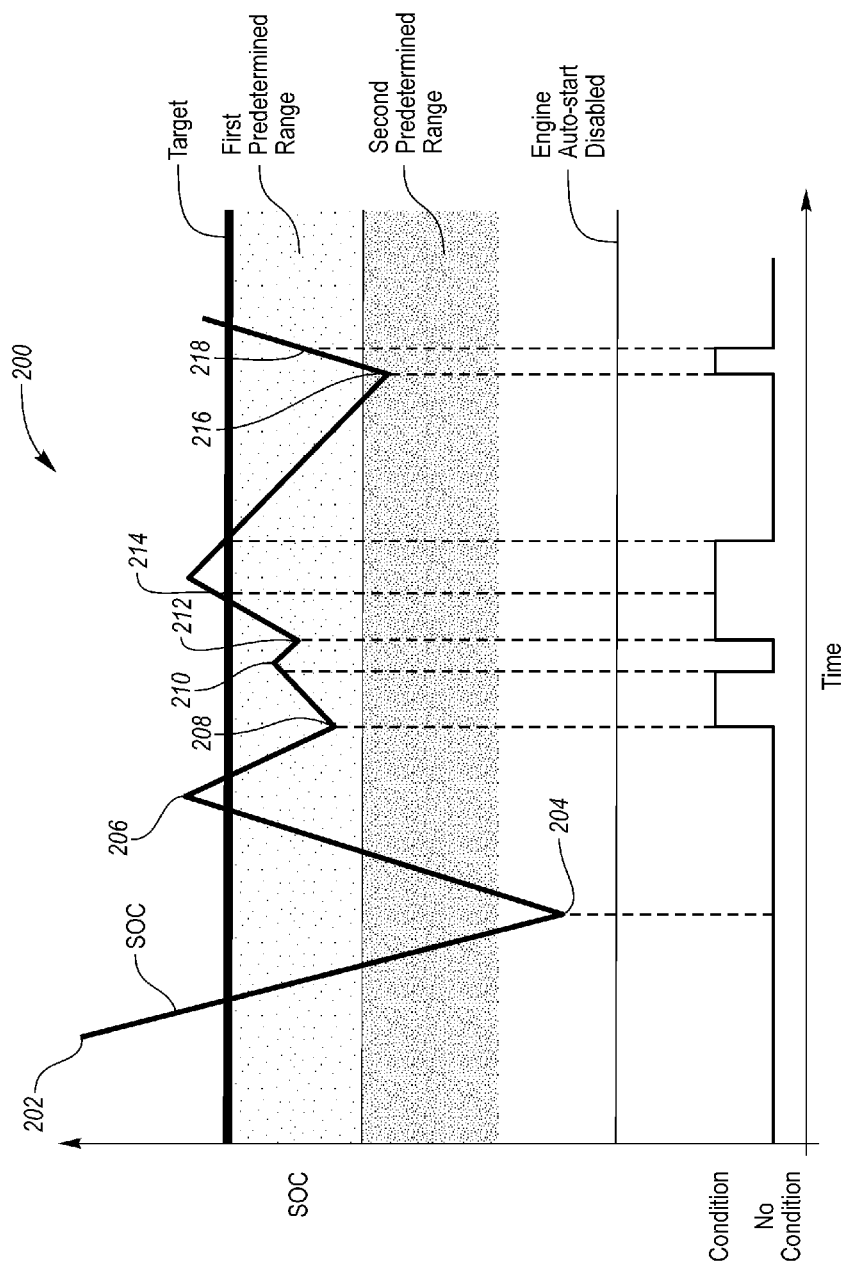
FIG. 4 is a plot of a battery's state of charge versus time before, during, and after an engine start/stop event.

Referring now to FIG. 4, a plot 200 whereby a vehicle controller performs an embodiment of this disclosure is depicted. Starting from the left of the chart and working right, the controller determines the battery's SOC at point 202. As the SOC begins to fall due to an activation of electrical loads, the SOC drops below the second predetermined range. The controller then auto-starts the engine without an auto-start condition being present at point 204. The engine is inhibited from auto-stopping until the SOC is greater than the target. Once the SOC is greater than the target, the engine is auto-stopped causing the SOC to decrease at point 206. The SOC then falls within the first predetermined range at point 208. At point 208, an engine auto-start condition exists and the engine auto-starts to increase the battery's SOC. At point 210, the engine auto-start condition ceases and the engine auto-stops. The SOC begins to fall again within the first predetermined range until another engine auto-start condition exists at point 212. The engine charges the battery until the battery's SOC is not less than the target. Once the SOC reaches the target, the engine auto-stops even with the condition is present at point 214. The SOC begins to decrease passing through the first predetermined range without an auto-start condition present. The SOC falls within the second predetermined range and the SOC continues to decrease until an auto-start condition exists at point 216. The engine is auto-started and the SOC begins to increase. The engine auto-start is maintained although the auto-start condition ceases at point 218. The SOC then reaches the target and the engine is auto-stopped.

Figure 5:
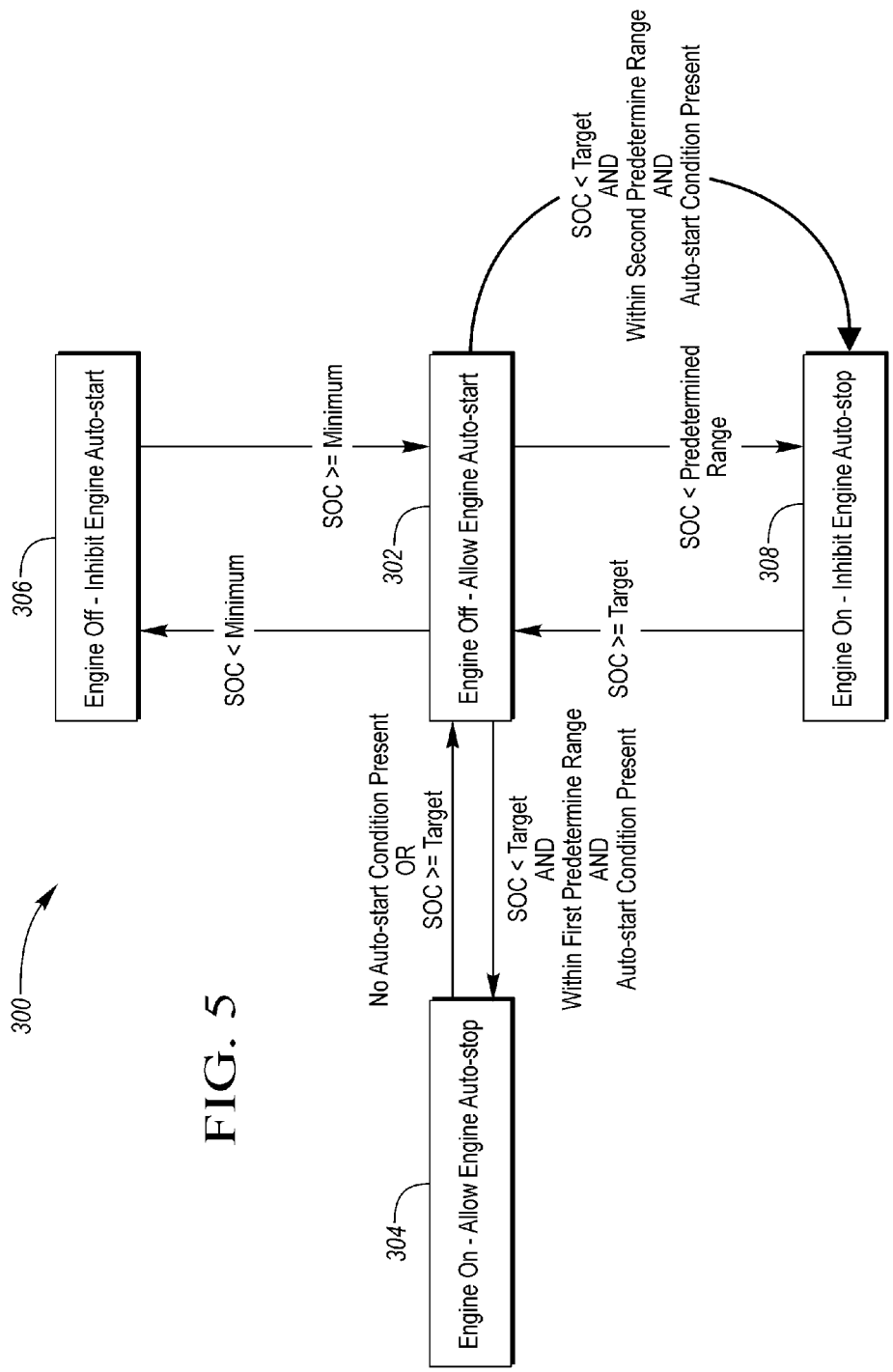
FIG. 5 is a state diagram of an engine control system.

Referring now to FIG. 5, a state diagram 300 depicts at least one embodiment of this disclosure. Beginning in state 302, the engine is off, and the engine may auto-start. If the SOC is less than the target, within the first predetermined range, and an auto-start condition is present, the engine may auto-start and the system may enter state 304. The system may return to state 302 when the auto-start condition ceases or the SOC is greater than or equal to the target. The system may enter state 306 when the SOC is below a minimum threshold. The system may return to state 302 when the SOC is greater than or equal to the minimum threshold.

From state 302, if the SOC is less than the second predetermined range, the system may start the engine and inhibit an engine auto-stop while entering state 308. The system may then return to state 302 when the SOC is greater than or equal to the target. The system may also move to state 308 when the SOC is less than the target, within the second predetermine range, and an auto-start condition is present. The system may then stay in state 308 until the SOC is greater than or equal to the target.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle engine control method, comprising:
by a processor,
in response to an engine start condition occurring while an SOC is within a first predetermined range, running the engine until first occurrence of the start condition ceasing or the SOC achieving a target, and
in response to an engine start condition occurring while the SOC is within a second predetermined range less than the first, running the engine until the SOC achieves the target.

2. The method of claim 1 further comprising, in response to the SOC falling below the second predetermined range, running the engine until the SOC achieves the target.

3. The method of claim 1, wherein the engine start condition includes activation of an electrical load.

4. The method of claim 1, wherein the first predetermined range and the second predetermined range are numerically adjacent to each other.

5. The method of claim 1 further comprising, in response to the SOC falling below a minimum threshold, prohibiting engine start.

6. The method of claim 1, wherein the target has a value greater than values within the first and second predetermined ranges.

7. The method of claim 1 further comprising adjusting the first predetermined range according to configuration data.

8. A vehicle comprising:
an engine;
a battery; and
a controller configured to,
in response to an engine start condition occurring while an SOC of the battery falls within a first predetermined range, running the engine until first occurrence of the start condition ceasing or the SOC achieving a target, and in response to an engine start condition occurring while the SOC falls within a second predetermined range less than the first, running the engine until the SOC achieves the target.

9. The vehicle of claim 8, wherein the controller is further configured to, in response to the SOC falling below the second predetermined range, running the engine until the SOC achieves the target.

10. The vehicle of claim 8, wherein the engine start condition includes activation of an electrical load.

11. The vehicle of claim 8, wherein the first predetermined range and the second predetermined range are numerically adjacent to each other.

12. A vehicle comprising:
an engine;
a battery; and
a controller configured to end an engine on-cycle for the engine with an auto-stop upon first occurrence of an engine start condition ceasing or an SOC of the battery achieving a target in response to the engine on-cycle beginning with an auto-start that is triggered by the engine start condition arising while the SOC is in a first predetermined range less than the target, wherein the controller is further configured to end the on-cycle for the engine with an auto-stop upon the SOC achieving the target in response to the engine on-cycle beginning with an auto-start that is triggered by the engine start condition arising while the SOC is in a second predetermined range less than the first predetermined range.

13. The vehicle of claim 12, wherein the controller is further configured to prohibit auto-start in response to the SOC falling below a minimum threshold.

14. The vehicle of claim 12, wherein the engine start condition includes presence of an electrical load.

* * * * *